United States Patent [19]

Tatarchuk

[11] Patent Number: 5,096,663

[45] Date of Patent: Mar. 17, 1992

[54] METHOD OF OPTIMIZING COMPOSITE PREPARATION FOR ELECTRICAL PROPERTIES: MAXIMUM CAPACITANCE ELECTRODES

[75] Inventor: Bruce J. Tatarchuk, Auburn, Ala.

[73] Assignee: Auburn University, Auburn University, Ala.

[21] Appl. No.: 529,870

[22] Filed: May 29, 1990

[51] Int. Cl.[5] .............................................. B22F 1/00
[52] U.S. Cl. ..................................... 419/11; 419/24; 419/36; 419/37; 419/38; 419/58
[58] Field of Search ..................... 419/11, 24, 34, 37, 419/38, 58

[56] References Cited

U.S. PATENT DOCUMENTS 4,678,718  7/1987  Wang .................................. 428/560

OTHER PUBLICATIONS

Kohler, Zabasajja, Krishnagapolon & Tatarchuk, "Metal-Carbon Composite ...", J. Electrochem. Soc., Y.137, #1, 136–141, (Jan., 1990).

Primary Examiner—Stephen J. Lechert, Jr.
Attorney, Agent, or Firm—Eugene I. Snyder

[57] ABSTRACT

Composites of a matrix of metal fibers and carbon fibers interlocked in and interwoven among a network of fused metal fibers are inherently capable of displaying a broad range of values of a particular physical property. Where the composite is made by sintering a preform of the fiber network dispersed in a matrix of an organic binder, the value of the physical property of the resulting composite is a function of several independent variables which can be controlled during composite fabrication. With particular regard to the capacitance of a stainless steel-carbon fiber electrode, there is described a method of optimizing capacitance during electrode fabrication.

28 Claims, 13 Drawing Sheets

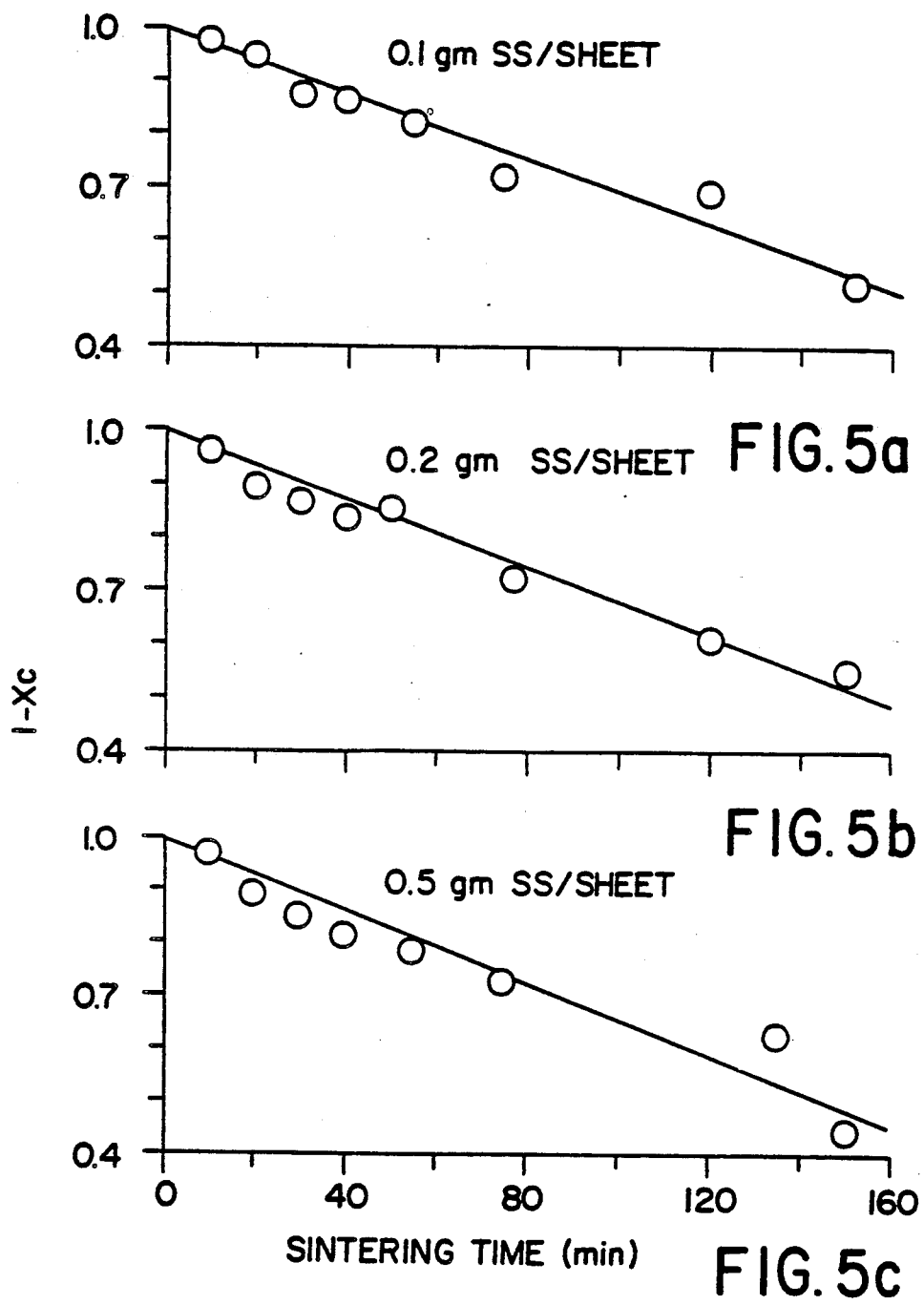

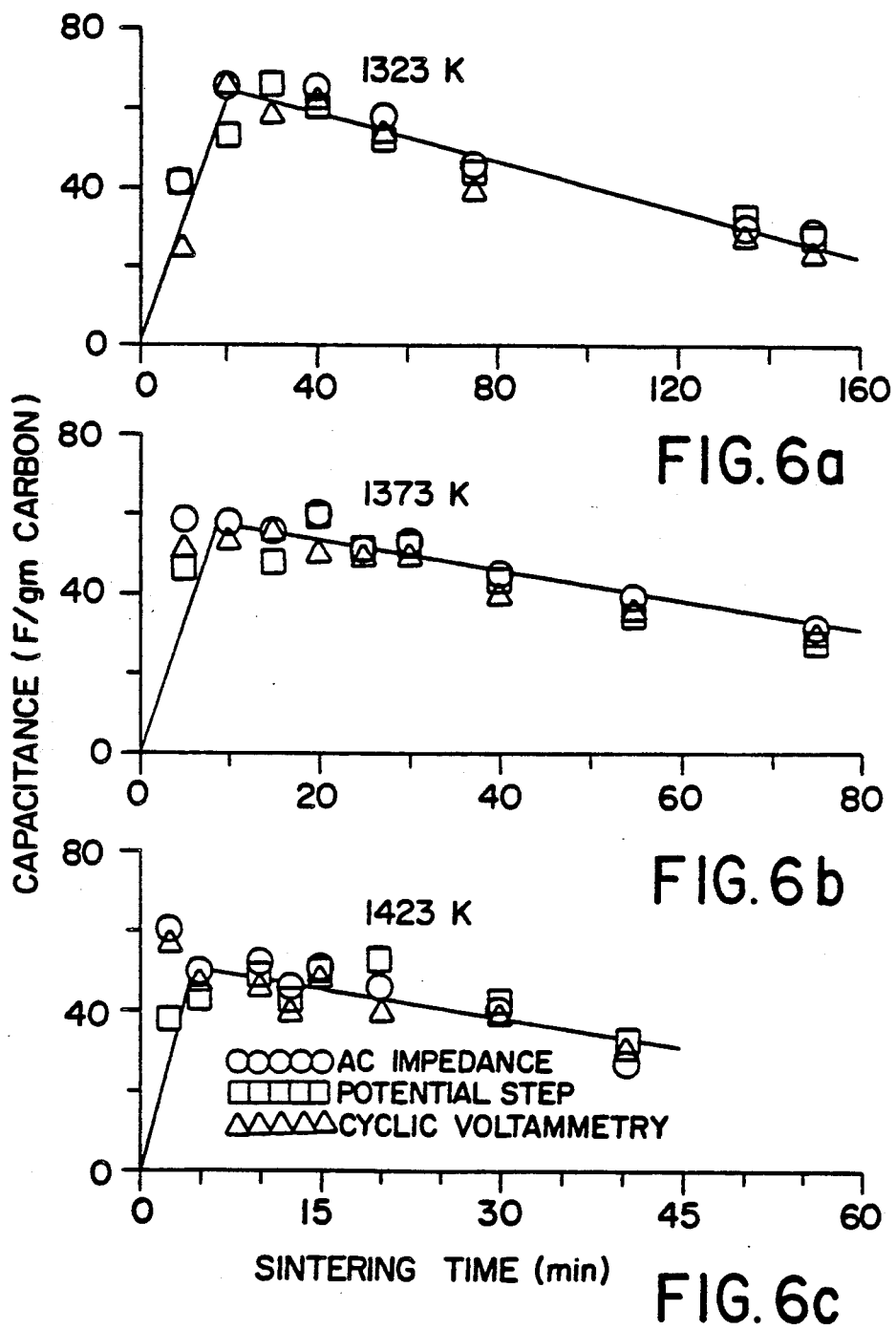

METHOD OF OPTIMIZING COMPOSITE PREPARATION FOR ELECTRICAL PROPERTIES: MAXIMUM CAPACITANCE ELECTRODES

ACKNOWLEDGEMENTS

This work was funded by Auburn University and the Space Power Institute as funded by the SDIO Innovative Science and Technology Office and the Defense Nuclear Agency under DNA Contract No. 001-85-C-0183. This invention was made with Government support under the aforementioned contract, and the Government has certain rights in this invention.

BACKGROUND OF THE INVENTION

The maximum energy and/or power densities obtainable from carbon based electrodes in liquid double layer capacitors, batteries, and fuel cells often depend on various physiochemical rate phenomena occurring at the electrode-electrolyte interface. The energy density in liquid double layer capacitors, for example, increases with increased surface area of the carbon electrode material presented to the electrolyte [Tiedemann, W., and Newman, J., *J. Electrochem. Soc.*, 122, 70, (1975)], while the power density is controlled and limited by the diffusion of electrolyte through the microporous electrode material [Rose, F., in *"Proceedings of the 33rd International Power Sources Symposium"*, Cherry Hill, N.J., June 13-16, 1988, The Electrochemical Society, Inc., p. 572 (1988)]. As a result, electrode capacitance depends on an interplay between increased diffusional processes and higher levels of surface area. Since higher levels of surface area entail smaller characteristic dimensions and smaller diffusional pathways, high energy density and high power density are often mutually exclusive.

For $Li/SOCl_2$ and other battery systems, reaction products tend to clog normal carbon cathodes at higher current densities ($>10$ mA/$cm^2$) [Mammone, R. J., and Binder, M., *J. Electrochem. Soc.*, 134, 37, (1987)] as a result of preferential precipitation at the exterior of the electrode. High power density cathode materials are required which are flexible and which have varying and adjustable porosities and void volumes so as to accommodate reaction products without significant loss in accessibility.

In $H_2$-$O_2$ fuel cells and other electrocatalytic processes, the power level and/or reaction selectivity and activity may be restricted by heat and mass transport limitations which occur at the electrode surface [Ticianelli, E. A., Derouin, C. R., Redondo, A., and Srinivason, S., *J. Electrochem. Soc.*, 135, 2209, (1989)]. Porous and flow-through electrocatalysts are desired which incorporate high specific surface areas of supported electrocatalysts such as platinum, palladium, nickel, gold, carbon, etc., while also being present in an easily accessible configuration to facilitate mass transport to active surface regions.

Previous work in this laboratory [Kohler, D. A., Zabasajja, J. N., A. Krishnagopalan, and Tatarchuk, B. J., *J. Electrochem. Soc.*, 137, 136, (1990)] has resulted in a procedure for preparing metal-carbon electrodes which appear to address many of the above mentioned problems associated with double layer capacitors, batteries, and fuel cells. Free standing electrodes, with variable porosities and void volumes, can be manufactured from a wide variety of metal fiber and carbon fiber sources. We now disclose a method of optimizing an electrical property in the preparation of composite electrodes made of high surface area carbon fibers and conductive stainless steel fibers. Stainless steel fibers were chosen because of their commercial availability in small diameters ($\leq 4$ $\mu$m) and their compatibility with a number of electrolytes.

SUMMARY OF THE INVENTION

This invention relates to optimizing some physical property of a composite comprising a network of metal fibers and carbon fibers having a plurality of bonded junctions at the fiber crossing points where the composite is made by sintering a preform of the network of fibers dispersed in a matrix of an organic binder. Optimization is performed by determining the rate equations, including apparent activation energies, for the domain within which the physical property increases and the separate domain where the physical property decreases. The optimal sintering time is determined within the envelope of independent variables, and the physical property is optimized separately with respect to each of the other independent variables. In a specific embodiment the composite is a stainless steel-carbon fiber article designed as an electrode, and the physical property in question is its capacitance. In a more specific embodiment the envelope is bounded by a maximum and minimum sintering temperature, and a maximum and minimum weight ratio of stainless steel fibers to carbon fibers. Other embodiments will be apparent from the description which follows.

DESCRIPTION OF THE FIGURES

FIG. 5(a-c) Weight loss data for electrodes made from paper precursors containing 0.1, 0.2, and 0.5 gm stainless steel/sheet, sintered at 1323 K.

FIG. 6(a-c) Capacitance versus time profiles for electrodes made from a paper precursor containing 0.5 gm stainless steel/sheet, sintered at 1323, 1373, and 1423 K.

DESCRIPTION OF THE INVENTION

Figure 1:
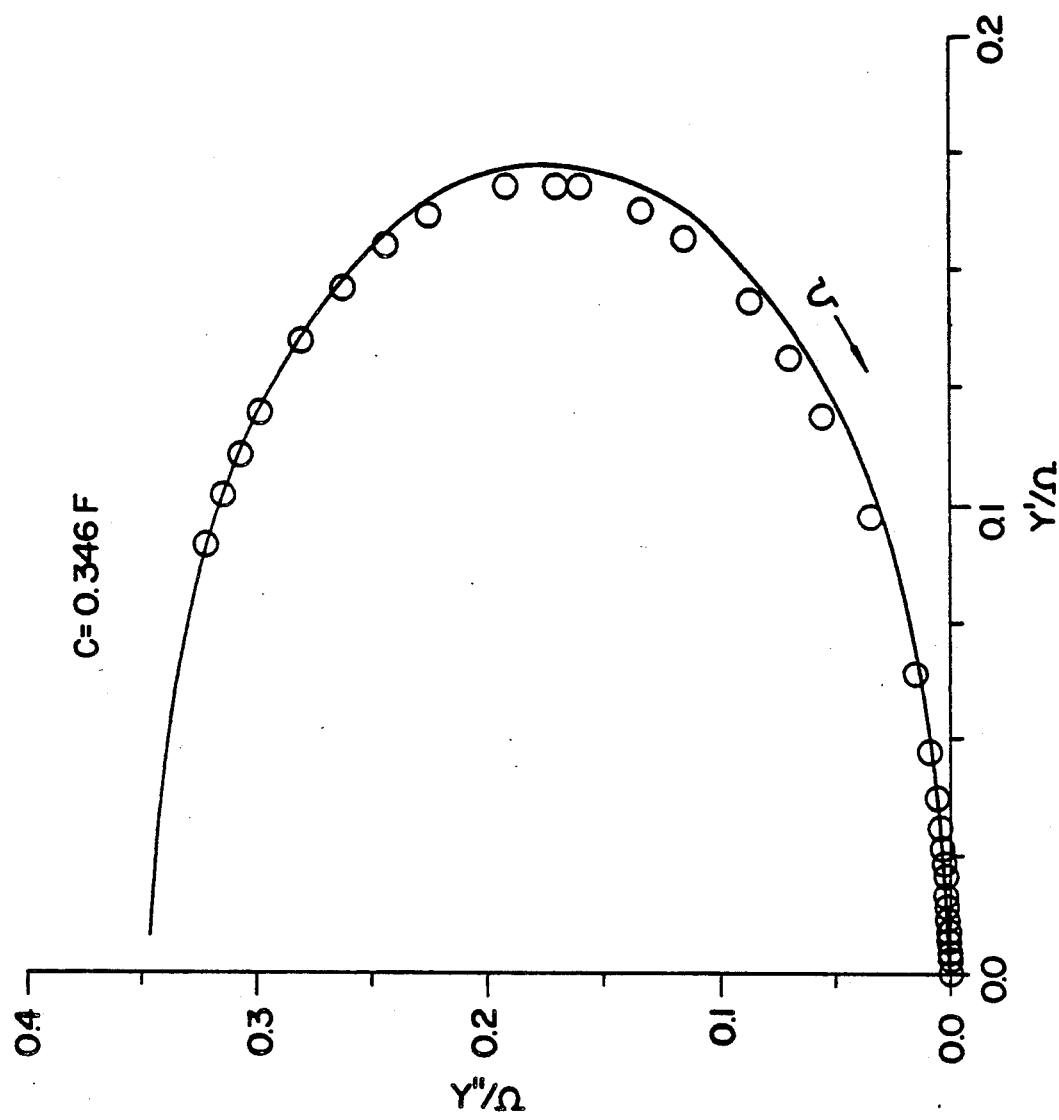
FIG. 1 Admittance plot for an electrode made from a paper precursor containing 0.5 gm stainless steel/sheet sintered at 1323 K for 40 min. The sintered electrode contained 0.00528 gm carbon.

The composites which we have chosen as electrode materials result from a marriage of carbon and metals in such a way that this combination of dissimilar and normally incompatible materials forms a physically stable composite structure which exhibits properties that are intermediate to the constituent materials. These composites are prepared most effectively by making a uniform dispersion of carbon fibers, metal fibers, and solid cellulosic binder in a liquid medium, collecting the wetted uniform solid dispersion and removing the liquid medium from it to afford a preform, and heating the preform in a gaseous atmosphere at conditions sufficient to vaporize at least 99% of the binder and to fuse the metal fibers. We have now found a method of optimizing a given electrical property of such composites during their preparation. Although most of the ensuing discussion will focus on the capacitance of the composites, we emphasize that the general method described is applicable to other properties as well such as void volume, electrochemical power density, surface area per unit weight, electrical conductivity, thermal conductivity, EMI/RFI damping, mechanical strength and toughness, and so on.

As stated above, the composite of this invention is a matrix of carbon fibers interlocked in and interwoven among a network of fused metal fibers. The composite is a network of metal fibers and carbon fibers having a plurality of bonded junctions at the fiber crossing points, where "bonded junctions" refers to those crossing points in the network where the fibers are securely physically connected in some sort of permanent union. Although it should be apparent that "carbon" in the phrase "carbon fibers" includes and encompasses graphite, we here specifically note that in the context of the remainder of this specification and in the claims "carbon fibers" includes carbon blacks and graphitic materials. The carbon fibers constitute from about 1 to about 98 weight percent of the final composite, although the range between about 20 to about 98 weight percent is preferred. There is no significant upper or lower limit for the diameter of the carbon fibers as regards the composite itself. That is, the diameter of the carbon fibers used in the composite influences its final properties rather than imposing limitations on the composite itself. Carbon fibers have been reported with a surface area from about 1500 $m^2/g$ to 1 $m^2/g$ and less, and with a diameter from 20 nm to about 1 mm. As an example, and as will become clearer from the descriptions within, for use in liquid double layer capacitors, $H_2/H_3PO_4/O_2$ fuel cells, and $Li/SOCl_2$ batteries, carbon fibers having a surface area of from 250 $m^2/g$ to about 1000 $m^2/g$ are most desirable with fibers having a diameter from 1 to about 10 microns, with a carbon content of the composite ranging from 30 to about 90 weight percent.

The carbon fibers generally are present as bundles. Single fibers tend to be brittle, whereas bundles or aggregates of fibers afford a composite with more desirable mechanical properties. As the diameter of the carbon bundles increases, the weight of metal fibers needed to keep the bundles interwoven or interlocked is decreased. The physical properties of the final composite also depend on the physical properties of the carbon fibers used; thermal stability, surface area, mean pore diameter, mechanical flexibility, resistance to electrolytes and acids, and electrocatalytic properties are examples of composite properties which are influenced by the properties of the constituent carbon fibers and any electroactive materials impregnated on the fibers. It should be emphasized that the surface area of the carbon fibers used largely determines the surface area of the final composite. Since different applications require different characteristics, the choice of carbon fiber properties often will be dictated by composite application. For example, where used in double layer capacitors one generally wants a certain minimum pore size, which in turn limits the surface area. In batteries mass transfer is more important and one wants a higher void volume, preferably with a bimodal pore size distribution. A graded porosity also is possible to attain using this invention and may be important in particular applications. However, what needs to be emphasized is that many of the composite properties are not only variable but are under the control of the investigator or fabricator within quite broad and flexible limits.

The carbon fibers are interwoven among, and interlocked in, a network of metal fibers. The metal fibers which may be used in the practice of this invention must be electrically conducting when used in an electrode, must be chemically inert under the conditions of their contemplated use, and must provide structural integrity and mechanical stability to the final composite under the contemplated conditions of use. So, for example, the final composite generally needs to retain its overall shape, and to retain the carbon fibers in the network relatively rigid and immobile. Examples of metal fibers which may be used in the practice of this invention include aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, beryllium, iridium, silicon, and combinations of the above. Metal alloys also may be used in the practice of this invention, as exemplified by constantan, hastelloy, nichrome, inconel, monel, carpenter's metal, and various steels, especially stainless steels, and other iron alloys. As can be appreciated, there is enormous flexibility in the choice of metal fibers. Because of their general availability and relatively modest cost, as well as favorable physical and chemical properties, various stainless steels are the materials of choice, especially in many electrode applications.

The diameter of the metal fibers used is largely dictated by their availability. Although in principle there is no upper or lower limit to metal fiber diameter there may be significant operational restrictions. For example, if the metal fiber diameter is greater than ten times, or less than one-tenth, the carbon fiber diameter, then the fused metal network may not hold the carbon fibers together adequately. Stated differently, the metal fiber diameter $D_m$ relative to the carbon fiber diameter $D_c$ is in the range $0.1\ D_m \leq D_c \leq 10\ D_m$. Another operational limitation is related to the number of metal-metal contacts, or fusion points, which are largely responsible for supporting the carbon fibers in the composite. Calculations show that the number of metal-metal contacts varies inversely with the square of the metal fiber diameter, hence there is a requirement for small diameter metal fibers where it is desirable to increase the overall weight fraction of carbon and surface area of the resulting composite. But in the context of novel composites per se, the diameter of the metal fiber used is not critical. The method of preparation and attainment of composites is not limited by metal fiber diameter, at least up to about 50 microns. In the context of composite properties, however, the diameter of the metal fiber is important and in practice it is desirable to have metal fibers with a diameter no more than about 10 microns but at least 0.1 micron. It would be most desirable to use metal fibers with a diameter in the range from about 0.5 microns to about 4 microns, but it needs to be emphasized again that the nature and diameter of the metal fibers used in the practice of this invention are limited largely by their availability rather than by any theoretical considerations.

The amount of metal in the final composite depends on how much surface area per gram is important, and, perhaps even more importantly, how good a contact is desired between the metal and the carbon fibers. It should be clear that the better the contact wanted, the higher the necessary percentage of metal fiber (at constant fiber diameter) in the final composite. Generally the composites of this invention will have a metal content ranging from about 2 up to about 99 weight percent, i.e., a metal to carbon weight ratio from about 0.02 to about 99, with a weight ratio between about 0.02 and 10 being preferable. As metal content increases, the composite shows reduced resistance and higher power density per gram with a lower surface area and lower energy density per gram.

One significant and important advantageous feature of our composites is that they are readily prepared via a preform, which is a solid containing a non-woven dispersion of the carbon and metal fibers in a binder. The binder provides a matrix in which the fibers of the carbon and metal are dispersed. The purpose of the binder is to permit the fabrication of a solid preform containing an otherwise structurally unstable dispersion of the elements of the final composite, -i.e., carbon and metal fibers-which can be shaped, stored, and otherwise handled prior to creation of an interlocked network via fusion of the metal fibers. The binder merely provides a stable, although weak, physical structure which maintains the spatial relationship of the components of the final composite prior to the latter's formation. Although the preform is only a temporary structure, it is an important one in the fabrication of the final composite. The binders used in preparation of the preform also may contain adjuncts, such as pore and void formers.

One critical property of the binders which may be used in the practice of this invention is that they volatilize at least to the extent of 90 weight percent, and preferably at least 99 weight percent, under conditions used for fusion of the metal fibers. The binder has no function in the composite, hence its presence should be minimal. Among binders which may be used in the practice of this invention are cellulose, organic resins such as polyvinyl alcohols, polyurethanes, and styrene-butadiene latex, and thermosets such as epoxies, urea-formaldehyde resin, melamine-formaldehyde resin, and polyamide-polyamine epichlorohydrin resin. Cellulose appears to be the premier binder because it volatilizes completely at relatively low temperatures with little ash formation and is unreactive toward the other components of the composite.

The binder is present in the preform at a range from about 2 up to about 80 weight percent. The minimum amount of binder is that which is necessary to give a stable preform, that is, one which can be handled, shaped, and so forth, an amount which depends upon carbon fiber loading, fiber size, and so forth. The amount of binder present in the preform will influence the void volume of the final composite, with a higher binder content affording a higher void volume, hence the binder can be used as one independent variable to control this property. Using cellulose with carbon fibers and stainless steel fibers as an example, a range from about 10 to about 60 weight percent of cellulose is a typical one.

The carbon and metal fibers are mixed with the binder and with a liquid of appropriate viscosity. The purpose of the liquid is to provide a medium for the facile and effective dispersion of the solids, for one wants as uniform a dispersion as is feasible in the final preform. Other than the need for the liquid being unreactive with the components, there are no other important limitations on the liquid which may be used. In the case of cellulose water normally will be the liquid, although water-alcohol mixtures, especially water-glycol, may be used. Illustrative examples include methanol, ethanol, propanol, ethylene glycol, propylene glycol, butylene glycol, poly(ethylene glycol)s, poly(propylene glycol)s, and so forth. The liquid medium also may contain salts where desirable.

After a dispersion is attained, the solids are collected, as on a mat. Excess liquid may be removed, such as by pressing, and the resulting solid dispersion is then dried. Where a thermosetting binder is used, the temperature of drying is important. However, in the more usual case there is nothing particularly critical in the drying process, and drying may be performed in air, under elevated temperatures, or in a flowing gas. The mass also may be compacted to a greater or lesser extent to affect void volume; the greater the compaction, the lower will be the void volume.

Fusion or sintering of the metal fibers in the dried preform, whose preparation was described above, is the final stage in the fabrication of the composite, and the particular conditions of sintering to optimize a given electrical property is the subject of our invention. In general, the preform is heated under conditions effecting sintering of the metals to provide a network of fused metal fibers. Fusion of the metal fibers at their points of contact rigidly locks the carbon fibers in place to afford a rigid structure by defining a matrix of carbon fibers interwoven or interlocked in a network of metal fibers with the structural rigidity arising from a multiplicity of fused points of contact. Sintering typically is done in a gas containing hydrogen at a partial pressure which is about 5 times the partial pressure of water in the gas stream, the water typically arising from the binder and from oxides on the surface of the metal. At the temperature of metal fusion, the metal also usually promotes gasification of carbon via its reaction with hydrogen to afford methane. The combination of sinter-fusing the metal fibers, forming good electrical contacts between the metal fibers and carbon fibers accompanying sintering, and the decrease in carbon content accompanying gasification of the carbon fibers gives rise to composites with varying electrical properties. When the composite is intended to be used as a capacitor it would be highly desirable to prepare the composite in such a way as to optimize its capacitance. The following will disclose just such a method of preparation, thereby enhancing even further the usefulness of our composites.

At this point we emphasize again that a stainless steel-carbon fiber composite is but representative of the composites which may be used, and capacitance is but illustrative of the properties which may be optimized according to our invention. For simplicity and clarity of exposition the following description is specific to the capacitance of a stainless steel-carbon fiber composite, but our invention is not limited thereto and is of far broader scope and greater universality.

The conductivity and capacitance of the sintered-matrix will depend on a number of variables including the relative amounts of metal and carbon used and on the sintering conditions employed during the preparation process. Using a stainless steel fiber-carbon fiber composite as exemplary, composite electrodes were characterized by measuring their capacitances, a direct measure of the active carbon surface area electrically connected to the electrolyte; see Tiedemann and Newman, op.cit. The capacitance, measured using AC impedance, potential step, and cyclic voltammetry methods, was correlated to kinetic parameters describing the sintering of metal fibers to each other and to the metal-catalyzed gasification of carbon. The observed kinetics were in turn used to predict the maximum attainable capacitance with respect to the composition of the electrode preform, sintering temperature, and sintering time. Energy densities of completed electrodes were then estimated.

EXPERIMENTAL

Materials

Materials used during electrode fabrication were: carbon fibers (Charcoal Cloth, Ltd.), 316L stainless steel fibers (Bekaert Steel Wire Corp.), cellulose fibers (a mixture of soft and hard woods) and 316L stainless steel foils (Arnold Engineering). Individual carbon fibers ($N_2$ BET surface area of 790 $m^2$/gm) were 2-3 $\mu$m in diameter and were used in the form of 20 $\mu$m diameter bundles ca. 5 mm in length. Stainless steel fibers were 2 $\mu$m in diameter and 2 mm in length. Cellulose fibers were 20-30 $\mu$m in diameter and 100-1000 $\mu$m in length. Stainless steel foils were 5 $\mu$m in thickness.

Paper Preforms

Carbon-stainless steel-cellulose composite papers (i.e., paper preforms) were prepared as 16 cm diameter circular sheets as outlined previously [Kohler et al., ibid.]. A series of paper preforms *with constant amounts of carbon and cellulose* (1.0 gm/sheet and 0.5 gm/sheet, respectively) and different loadings of stainless steel fibers were made to examine the effects of stainless steel loading on electrode performance. The amounts of stainless steel in the various sheets were 0.1, 0.2, and 0.5 gm of fiber per sheet.

Stainless steel-cellulose composite papers were also made. These preforms, containing 0.5 gm cellulose/sheet and 0.5 gm stainless steel/sheet, were used as an overlayer covering to enhance electrical contact and protect the active carbon-containing layer from abrasion during handling [Kohler et. al., ibid.]

Electrode Fabrication and Sintering

Paper preforms were cut and assembled, and the layered electrode preform heat treated as described in Part I of this investigation [idem, ibid.]. Sintering was performed in an atmosphere of pure hydrogen (99.995%, Liquid Air) with a linear flow rate of 2.6 cm/min (STP) at a total pressure of 101 kPA. Heat treatment was performed at 1323K, 1373 K, and 1423 K for the paper preform containing 0.5 gm stainless steel/sheet to examine the effects of sintering temperature on electrode performance. Additional experiments were performed at 1323 K for paper preforms containing 0.1, 0.2, and 0.5 gm stainless steel/sheet to examine the influence of stainless steel loading.

Weight Loss Measurements

The amount of carbon retained in the electrode after sintering was established from weight change measurements and the earlier observation that cellulose was quickly removed during heat treatment [idem, ibid.]. These measurements were obtained on a Sartorius Model R 160 D semimicro balance with an accuracy and a precision of 0.02 mg.

Electrochemical Measurements

Electrodes were spot welded to 0.25 mm diameter nickel wires (99.995%, Johnson Matthey Inc.) to allow for electrical contact. The connecting wire was mounted inside a 23 cm long flint glass Pasteur pipette (Fisher Scientific), and sealed with quick set epoxy (Duro) to separate the connecting wire from the test solution.

The experimental cell (Electrosynthesis, Inc.) was of the H-type design. The cell featured a platinum wire mesh counter electrode (99.9%, Johnson Matthey Inc.) and a saturated calomel (SCE) reference electrode (Fisher Scientific). The working and counter electrode chambers were separated by a microporous film (Celgard 3401, Hoechst Celanese Corp.).

Electrode characterization was conducted in a deoxygenated solution of 1.0M $Na_2SO_4$ (99.97% pure $Na_2SO_4$ crystals, Fisher Scientific) at 300 K. Distilled and deionized $H_2O$ was utilized in solution preparation. The selection of this particular electrolyte was based on: (i) a slow corrosion rate of stainless steel of less than 50 $\mu$m of penetration/yr [Schweitzer, P. A., "Corrosion Resistance Tables", Marcel Dekker, Inc., 1062, 1976], (ii) a solution conductivity of ca. 83 mmho/cm [Weast, R. C. (ed.), "CRC Handbook of Chemistry and Physics, 64th Ed.," The Chemical Rubber Co., D-305, 1983], and (iii) an electrolyte dielectric constant of 67.0 [Conway, B. E., "Electrochemical Data", Elsevier Publishing Co., 47, 1952].

Electrochemical measurements were made using an EG&G Princeton Applied Research System. The measurement system included an EG&G PARC Model 273 Potentiostat/Galvanostat, Model 5208 Two Phase Lock-in Analyzer, and an IBM Model 30 micro-computer.

Electrode Assessment

Electrode capacitance was determined by three independent methods: admittance plots of AC impedance data, single potential step measurements, and cyclic voltammetry. AC impedance measurements were made over the frequency range from 0.002 Hz to 100 kHz at the open circuit potential ($\approx$ −550 mV vs SCE). Single potential step measurements (magnitude of 5 mV) were also carried out at −550 mV vs SCE. Cyclic voltammetry was performed over the potential range from −800 to 800 mV vs SCE. A scan rate of 100 mV/sec was applied for five sweeps.

Electrochemical Model

The electronic model used to determine electrode performance is a series RC circuit. This simple model included terms for the total effective resistance of the composite electrode system ($R_T$) and the electrode's double layer or interfacial capacitance (C) [Shih, H., and Pickering, H. W., *J. Electrochem. Soc.*, 134, 1943, (1987)]. Capacitance values obtained using this model by AC impedance, potential step, and cyclic voltammetry were in good agreement and supported the use of this relatively simple model (see FIGS. 1-3). The total electrode capacitance obtained included the capacitance due to double layer charging and the capacitance due to faradaic reactions, which are parallel processes.

For AC impedance, the capacitance was determined from an admittance plot, where the capacitance was found from [Mansfeld, F., Kendig, M. W., and Tsai, S., Corrosion, 38, 570, (1982)]:

$$\lim_{\Omega \to 0} (Y''/\Omega) = \frac{C}{(1 + \Omega^2 + (R_T)^2 C^2)} = C \quad [1]$$

where $Y''$ is the imaginary admittance and $\Omega$ is the angular frequency. Data obtained from an electrode made from a paper precursor containing 0.5 gm stainless steel/sheet and sintered at 1323 K for 40 minutes are shown in FIG. 1. The sintered electrode contained 0.00528 gm carbon. The AC impedance data in the admittance plot were fitted to various equivalent circuit models which yielded similar values of the total capacitance. While a distribution of relaxation times is often observed from microporous systems [De Levie R., "Advances in Electrochemistry and Electrochemical Engineering", Vol. 6, 329 (1967)], it should be noted that the active surface area in the electrodes was contained within the pores of contiguous carbon fibers (2 μm diameter, ca. 800 m²/gm, 2.0 nm diameter internal porosity) [Kohler et. al., ibid.] Since the vast majority of the active surface area was contained in pores of ca. 2.0 nm, while the fibers themselves were quite accessible and interspaced with larger dimensions (ca. 50 μm), it is likely that the predominance of a single time constant reflects a strong overall dependence of capacitance on intraparticle/intra-fiber mass transfer.

For the potential step method, the current varied by the relationship [Bard, A. J., and Faulkner, L. R., "Electrochemical Methods, Fundamentals and Applications", John Wiley and Sons, 11, (1980)]:

$$i = i_o \exp(-t/\tau), \quad [2]$$

where $i_o$ is the peak current and:

$$\tau = CR_T. \quad [3]$$

Figure 2:
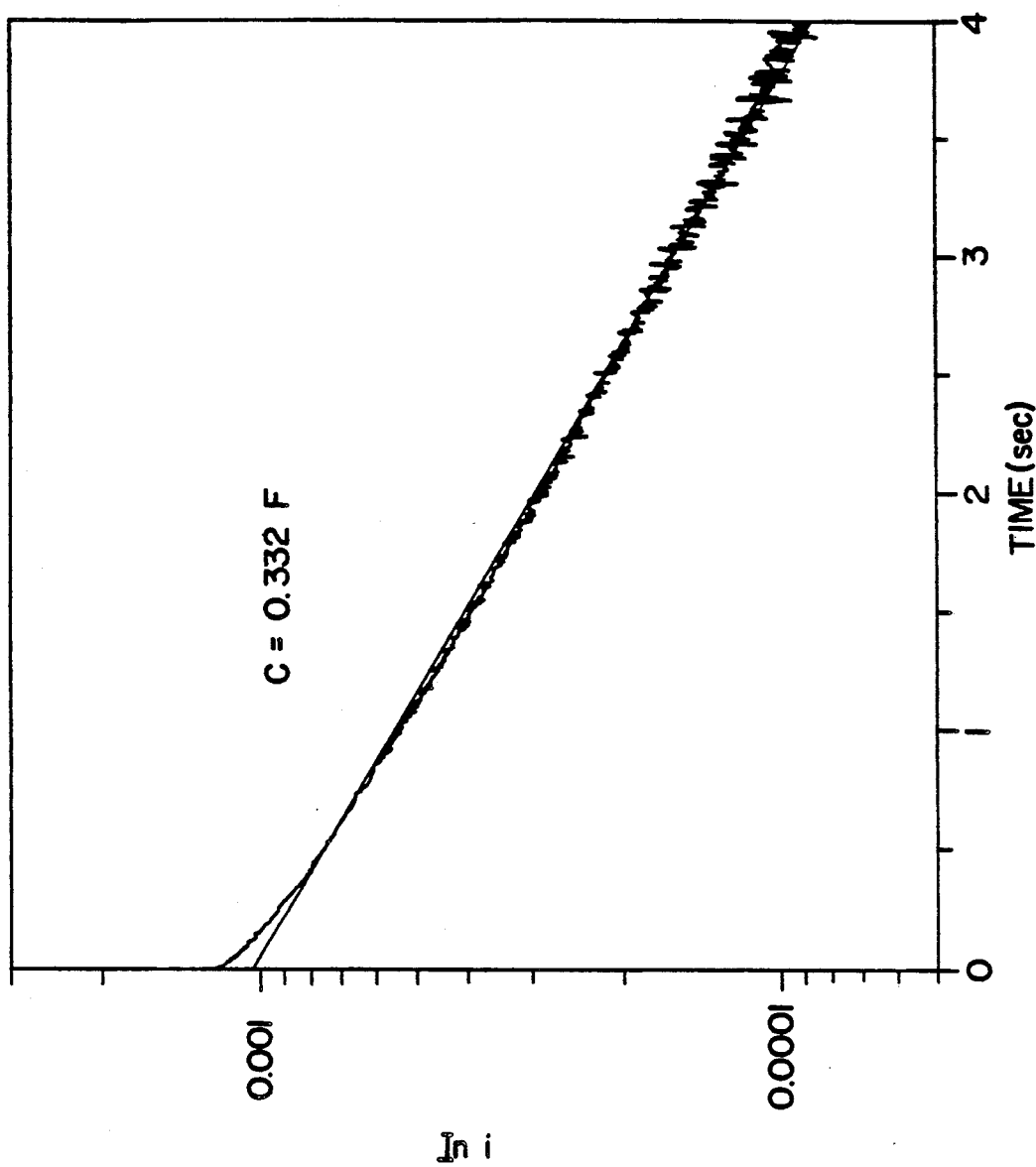
FIG. 2 Potential step for the electrode of FIG. 1.

The values of $\tau$ and $i_o$ were determined by least squares analysis of ln i versus t data, where $\tau$ equaled the negative inverse of the resulting slope and $i_o$ was the intercept. $R_T$ was calculated using:

$$R_T = DV/i_o, \quad [4]$$

where DV is the potential step perturbation. The capacitance was then found from Equation [3]. Potential step data obtained from an electrode made from a paper precursor containing 0.5 gm stainless steel/sheet and sintered at 1323 K for 40 minutes are shown in FIG. 2. The sintered electrode contained 0.00528 gm carbon and is the same electrode shown in FIG. 1.

Figure 3:
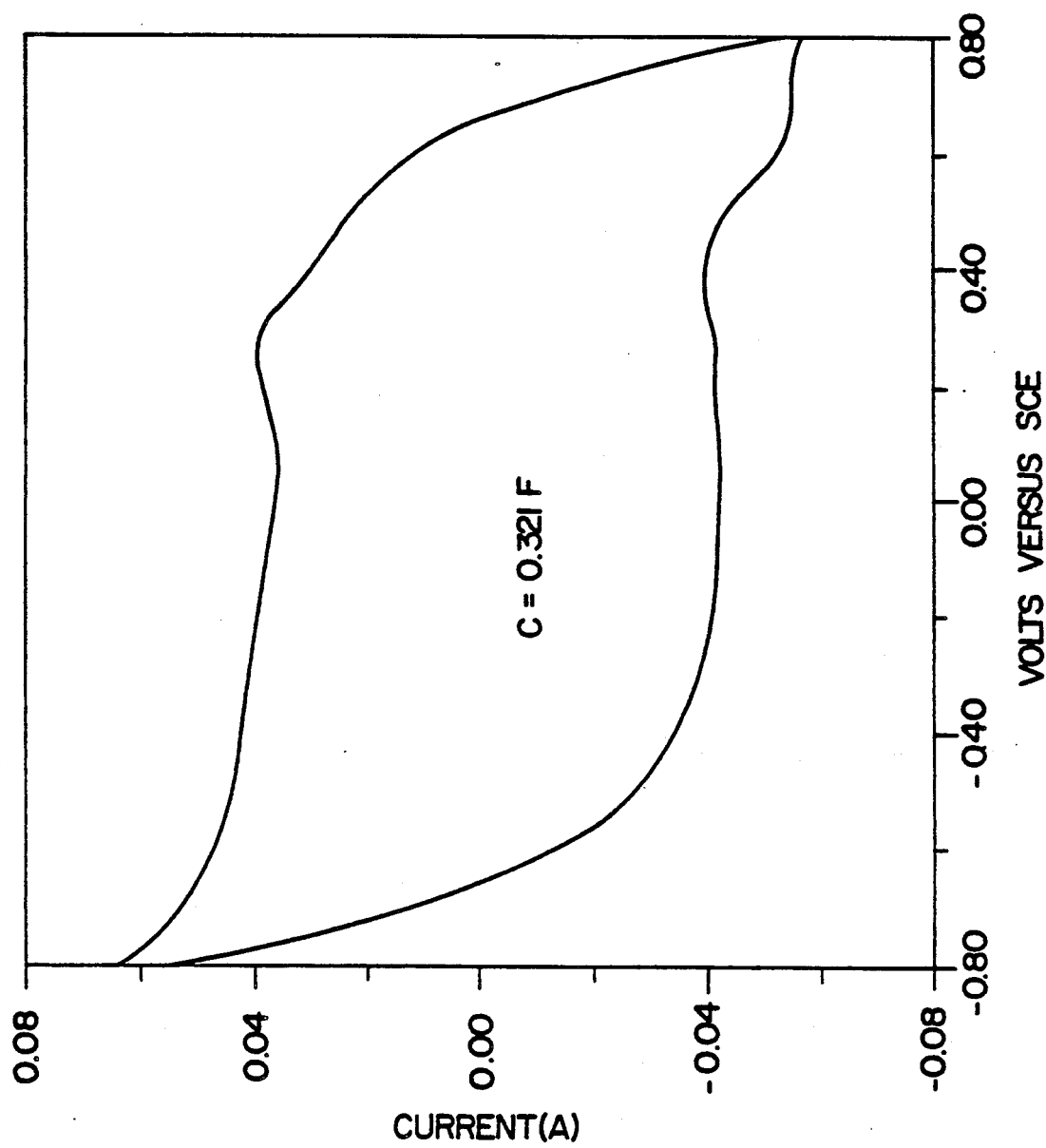
FIG. 3 Cyclic voltammogram for the electrode of FIG. 1.

For cyclic voltammetry, the average capacitance over the scanned potential region was calculated from the charge stored (q) in the resulting I-V envelope [Yeo, R. S., Orehotsky, J., Visscher, W., and Srinivasan, S., J. Electrochem. Soc., 128, 1900, (1981)], using the equation:

$$C = \frac{q}{2v\Delta t}, \quad [5]$$

where v is the sweep rate, and $\Delta t$ is the time it takes to scan in one direction. The factor of 2 in the denominator accounts for scanning in both the anodic and cathodic directions. Voltammetric data obtained for an electrode made from a paper precursor containing 0.5 gm stainless steel/sheet and sintered at 1323 K for 40 minutes are shown in FIG. 3. The sintered electrode contained 0.00528 gm carbon and is the same electrode used in FIGS. 1 and 2. Since faradaic and pure capacitive features are noted in FIG. 3, a comparison of the capacitive charging current versus sweep rate was made and a linear dependence obtained, indicating that the charging process was reversible.

DISCUSSION OF RESULTS—THE OPTIMIZATION MODEL

To better understand our results and the subsequent development of a working hypothesis leading to optimization of an electrical property—in the foregoing examples, capacitance—in the fabrication of the class of composites in question, it appears useful to briefly summarize what we believe is the phenomenological basis of our invention. What we have found is that at a given ratio of stainless steel to carbon fiber and sintering temperature, the capacitance of the resulting composite initially increases but then decreases, with the capacitance showing a definite maximum with sintering time. Although initially puzzling, reflection led to the following hypothesis which appeared to at least qualitatively account for these observations.

Two concurrent and independent reactions take place during sintering. One is the sinter-fusing of the stainless steel fibers at a multiplicity of their crossing points within the network to form a rigid three-dimensional matrix. Within this matrix there are multiple fusion points of the stainless steel fibers with excellent electrical contact at such nodes. In addition, formation of the rigid three-dimensional matrix results in the carbon fibers becoming enmeshed in the stainless steel fiber network resulting in a multiplicity of contact points between the carbon and stainless steel fibers and good electrical as well as physical contact between the dissimilar fibers. Consequently, the initial stages of sintering manifest the results of increasing the number of electrical contact points.

The other reaction occurring during sintering is the metal-catalyzed gasification of carbon, that is, the reaction of carbon with hydrogen to form gaseous methane. Metal catalyzed gasification is not uniform along the carbon fiber, but rather is localized at the stainless steel-carbon fiber junctions. Consequently, following the formation of a junction, gasification of the carbon at the junction tends to break the electrical contact; the longer the sintering time, the more the gasification, the more electrical contacts between carbon and the metal fibers will be broken, all of which lead to a decrease in capacitance.

Although the sinter-fusing of the metal fibers and the gasification of carbon are quite independent and concurrent reactions, nonetheless they are competing reactions in the context of the capacitance of the resulting composite. Using the aforegoing phenomenological description one can then construct a basis for optimizing capacitance, or any other electrical property, based on the kinetics of two competing reactions. In particular, one can determine the kinetic equations describing the increase in capacitance and the kinetic equations describing the capacitance decrease. Both equations will incorporate the independent variables of time, temperature, and stainless steel (or more generally, metal) to carbon fiber ratio, and also will implicitly yield the activation energy for the processes of capacitance increase and capacitance decrease. From these equations one then can calculate the sintering time for maximum capacitance at any sintering temperature and metal loading. One then can generate data by varying sintering temperature and metal fiber to carbon fiber loadings to determine the maximum capacitance on a total weight basis. This will then afford a composite whose capacitance has been maximized with respect to metal fiber to carbon fiber ratio, sintering temperature, and sintering time. The ensuing sections are a more detailed exposition of our method.

RESULTS

Weight Loss Measurements

The loss of carbon, due to catalyzed gasification, was monitored by the change in electrode weight beyond the removal of cellulose after sintering for various lengths of time. These calculations were based on the complete removal of cellulose after short sintering times (ca. 5 min at 1323 K), and were verified during control studies using stainless steel-cellulose preforms which did not contain carbon. The gasification rate was defined as:

$$r_g = -(1/M_{co})(dM_c/dt) = k_{go} \exp(-E_g/RT)[SS]^{n_g}, \quad [6]$$

where $r_g$ is the gasification rate (min)$^{-1}$, $M_{co}$ is the initial mass of carbon (gm), $M_c$ is the mass of carbon (gm) at any time t (min), $k_{go}$ is the rate constant for gasification (min$^{-1}$ (gm stainless steel)$^{-n_g}$), $E_g$ is the apparent activation energy for gasification (kJ/mol), [SS] is the weight of stainless steel fibers used in the paper precursor sheet (gm/sheet), and ng is the order of reaction in stainless steel. The reaction rate was considered zero order in carbon since its level was held constant in the paper preforms and since the metal catalyst particles arising from the stainless steel fibers were supported by and therefore always in contact with excess carbon during sintering. Integrating Equation [6], at constant temperature and stainless steel content, with the boundary condition, $M_c = M_{co}$ at t=0 yields:

$$M_c = M_{co} - r_g M_{co} t = M_{co}(1 - r_g t). \quad [7]$$

Figure 4:
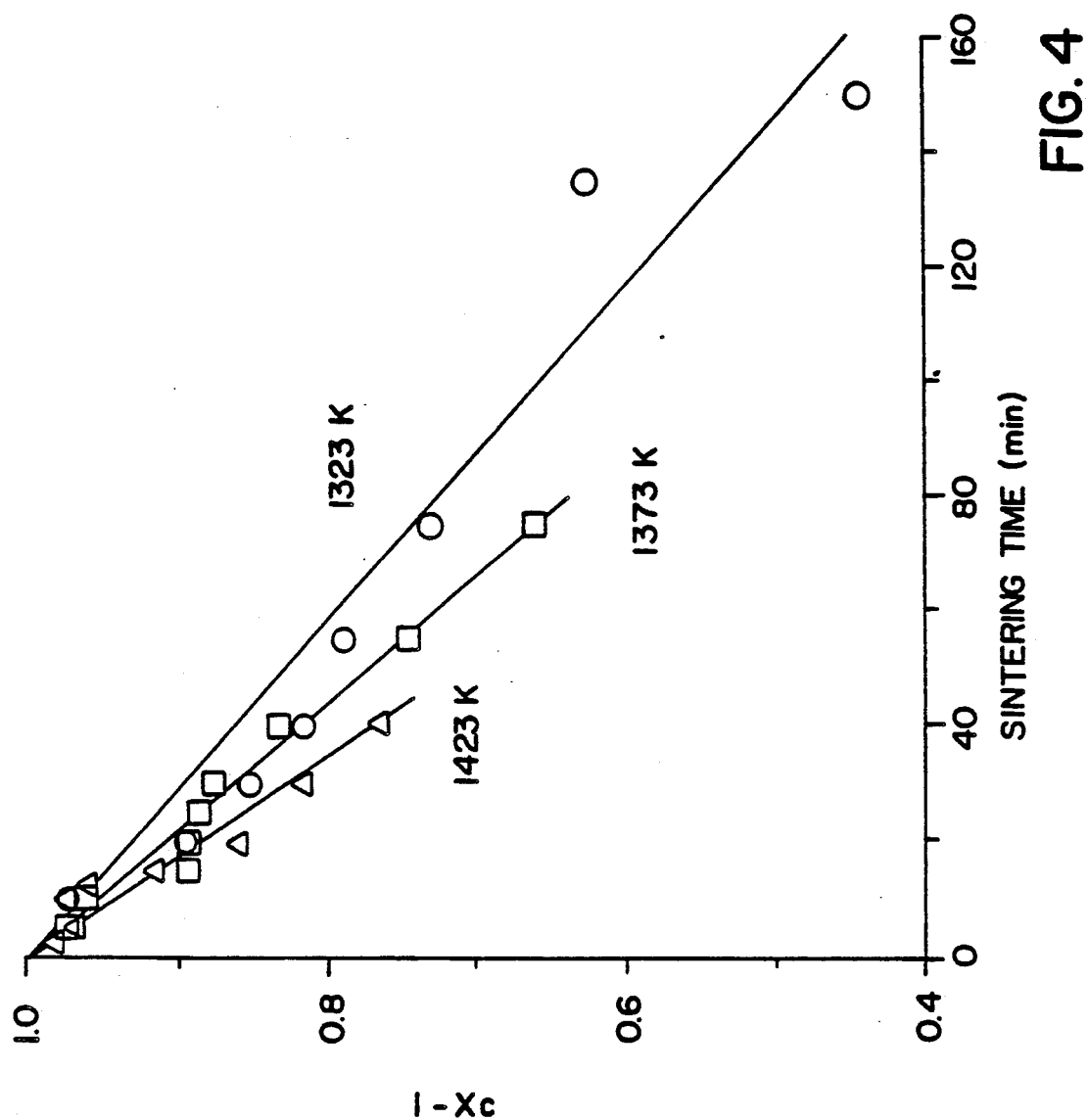
FIG. 4 Weight loss data for electrodes made from a paper precursor containing 0.5 gm stainless steel/sheet, sintered at 1323, 1373, and 1423 K.

By defining the fractional conversion of carbon, $X_c$ as:

$$X_c = (M_{co} - M_c)/M_{co}, \quad [8]$$

the equation:

$$1 - X_c = 1 - r_g t, \quad [9]$$

can be developed for assigning $r_g$ as the negative slope of a plot of $1 - X_c$ versus t. Data obtained for a paper precursor containing 0.5 gm stainless steel/sheet sintered at 1323 K, 1373 K, and 1423 K are shown in FIG. 4, while data for paper precursors containing 0.1, 0.2, and 0.5 gm stainless steel/sheet, sintered at 1323 K, are shown in FIG. 5.

Electrochemical Measurements

Figures 7A, 7B, 7C:
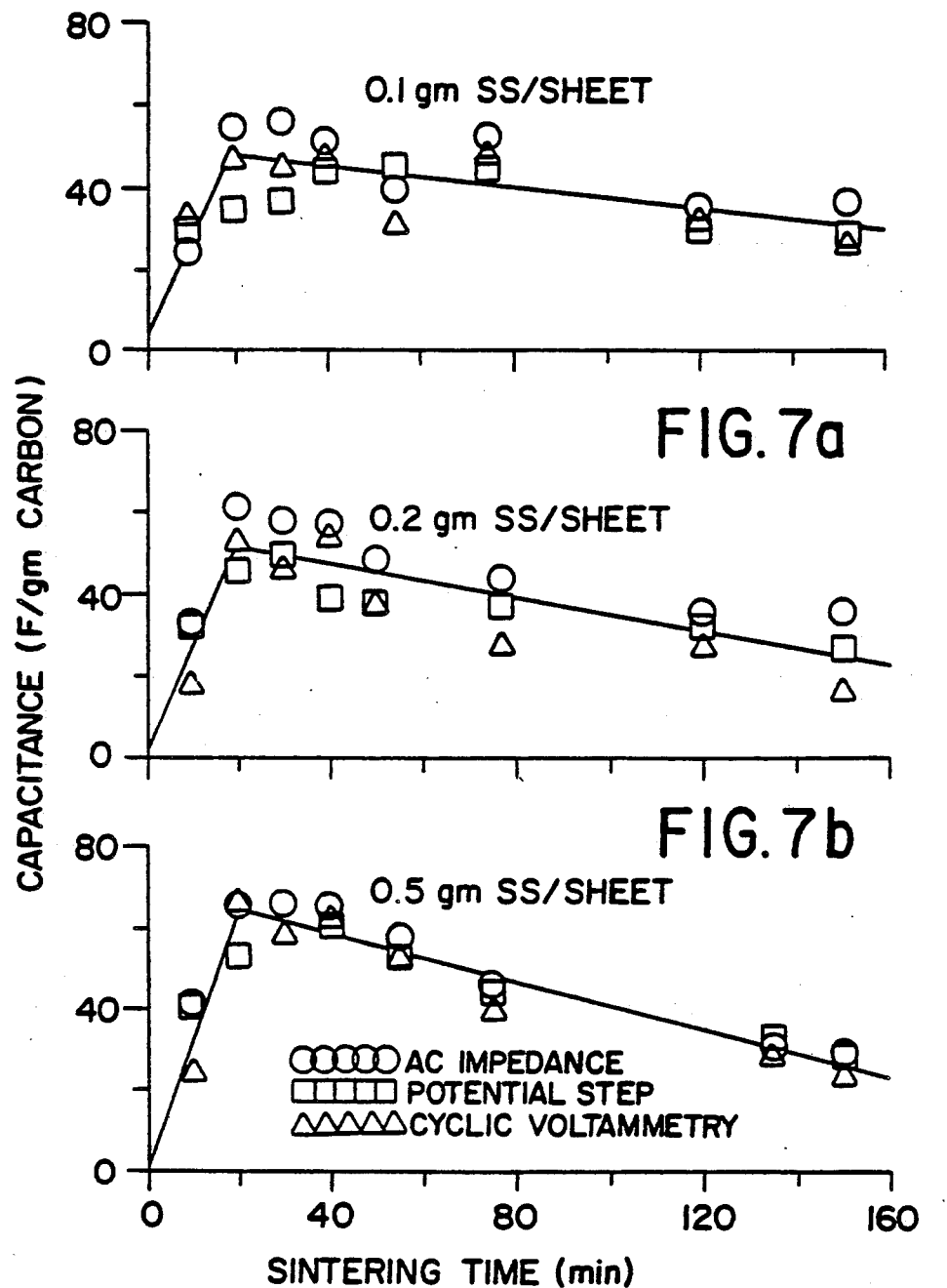
FIG. 7(a-c) Capacitance versus time profiles for electrodes made from paper precursors containing 0.1, 0.2, and 0.5 gm stainless steel/sheet, sintered at 1323 K.
Figure 8:
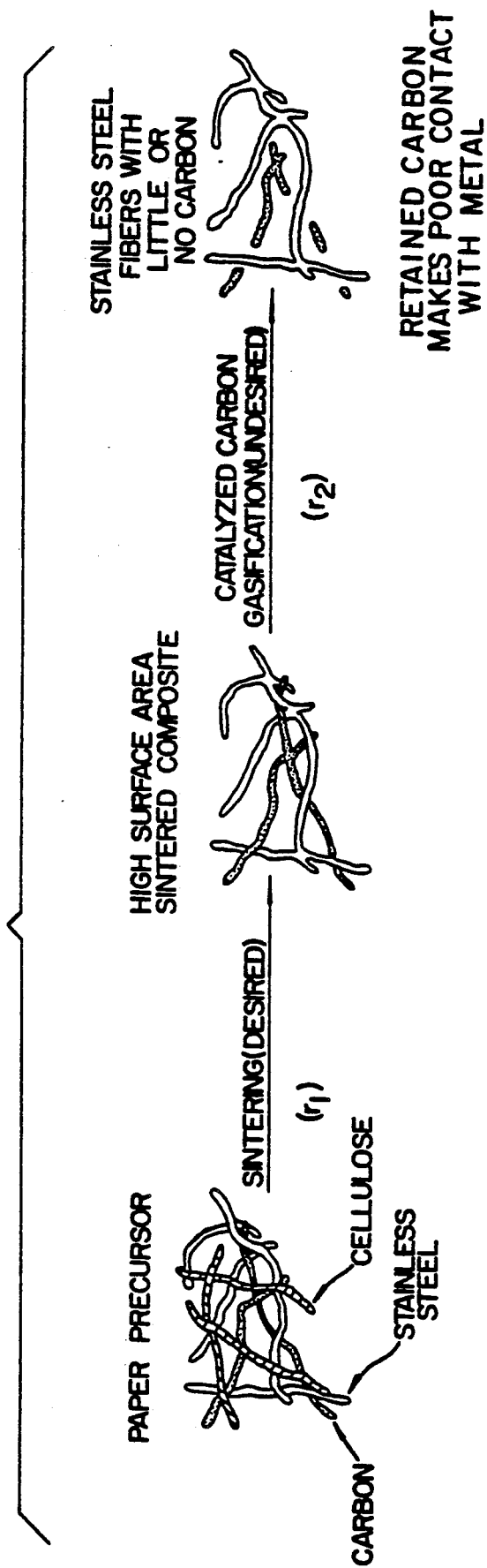
FIG. 8 Model for series reaction pathway encountered during sintering.

Capacitance versus sintering time profiles for various stainless steel loadings and temperatures are shown in FIGS. 6 and 7. Initially, as sintering time increased, the measured capacitance, on a per gram of carbon basis, rapidly increased. After passing through a maximum, the capacitance slowly decreased with sintering time. A series reaction scheme was proposed as a simple model relating sintering time to the observed capacitance data. The series reaction is shown schematically in FIG. 8, where carbon first becomes electrically activated or contacted by the formation of sintered metal-metal joints ($r_1$) and the removal of cellulose. This contacted carbon may then be converted to gaseous products by the catalytic pathway ($r_2$). The reaction rates are defined as:

$$r_1 = dC/dt = k_{1o} \exp(-E_1/RT)[SS]^{n_1} \text{ for } 0 < t \leq t_1, \quad [10]$$

$$r_2 = -dC/dt = k_{2o} \exp(-E_2/RT)[SS]^{n_2} \text{ for } t_1 \leq t < t_2, \quad [11]$$

where $r_1$ and $r_2$ are reaction rates (F (gm carbon)$^{-1}$ min$^{-1}$), C represents the measured capacitance (F/gm carbon), $k_{1o}$ and $k_{2o}$ are measured rate constants (F (gm carbon)$^{-1}$ min$^{-1}$ (gm stainless steel)$^{-n_i}$), $E_1$ and $E_2$ are apparent activation energies (kJ/mol), [SS] is the weight of stainless steel fibers used in the paper precursor sheet (gm/sheet), $n_1$ and $n_2$ are orders of reaction, $t_1$ is the time (min) where sintering is complete, and $t_2$ is the time (min) where all carbon has been gasified. Integrating Equation [10] at constant temperature and stainless steel content, with the boundary condition C=0 at t=0, which was an experimentally verified point, gives:

$$C = r_1 t. \quad [12]$$

Integrating Equation [12] at constant temperature and stainless steel content yields:

$$C = -r_2 t + b_2, \quad [13]$$

where $b_2$ (F/gm carbon) is a constant.

Determination of Kinetic Parameters

In order to determine the roles of sintering temperature and stainless steel loading, two sets of experiments were performed. In the first set, sintering temperature was varied as the stainless steel loading was held constant. In the second set, the amount of stainless steel was varied at constant sintering temperature. FIGS. 4 and 6 provide gasification and capacitance data versus sintering time as obtained at 1323 K for a stainless steel loading of 0.5 gm. These data were linearly regressed using Equations [9], [12], and [13]. Parameters describing gasification, sintering, and capacitance loss rates for differing stainless steel loadings and sintering temperatures were obtained and are shown in Table I.

Effects of Stainless Steel Loading

Figure 9:
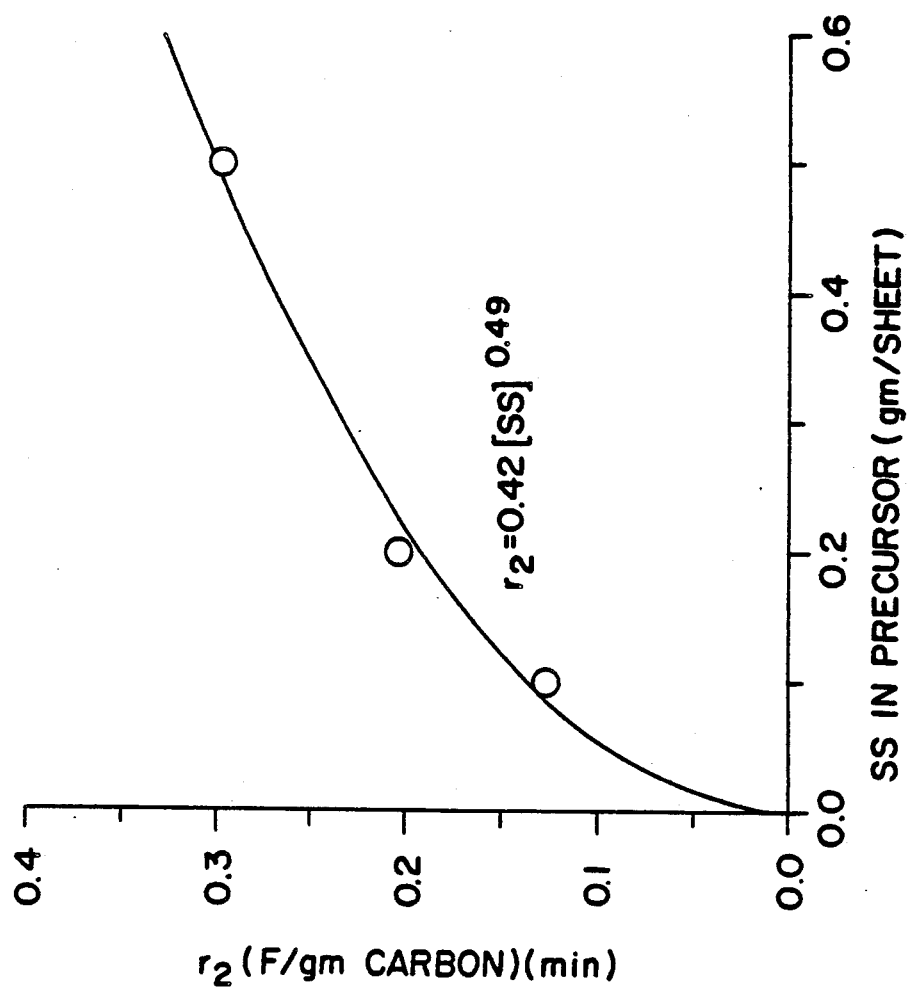
FIG. 9 Determination of order of reaction of capacitance loss ($r_2$) in stainless stell loading at 1323 K.

Reaction rates ($r_g$, $r_1$, $r_2$) were fit to Equations [6], [10], and [11] at constant temperature for determination of the order of each reaction in stainless steel. The plot of capacitance loss ($r_2$) versus stainless steel loading ([SS]) is shown in FIG. 9. Orders of reaction for gasification ($n_g$), sintering ($n_1$), and capacitance loss ($n_2$) are presented in Table II.

Temperature Effects

Figure 10:
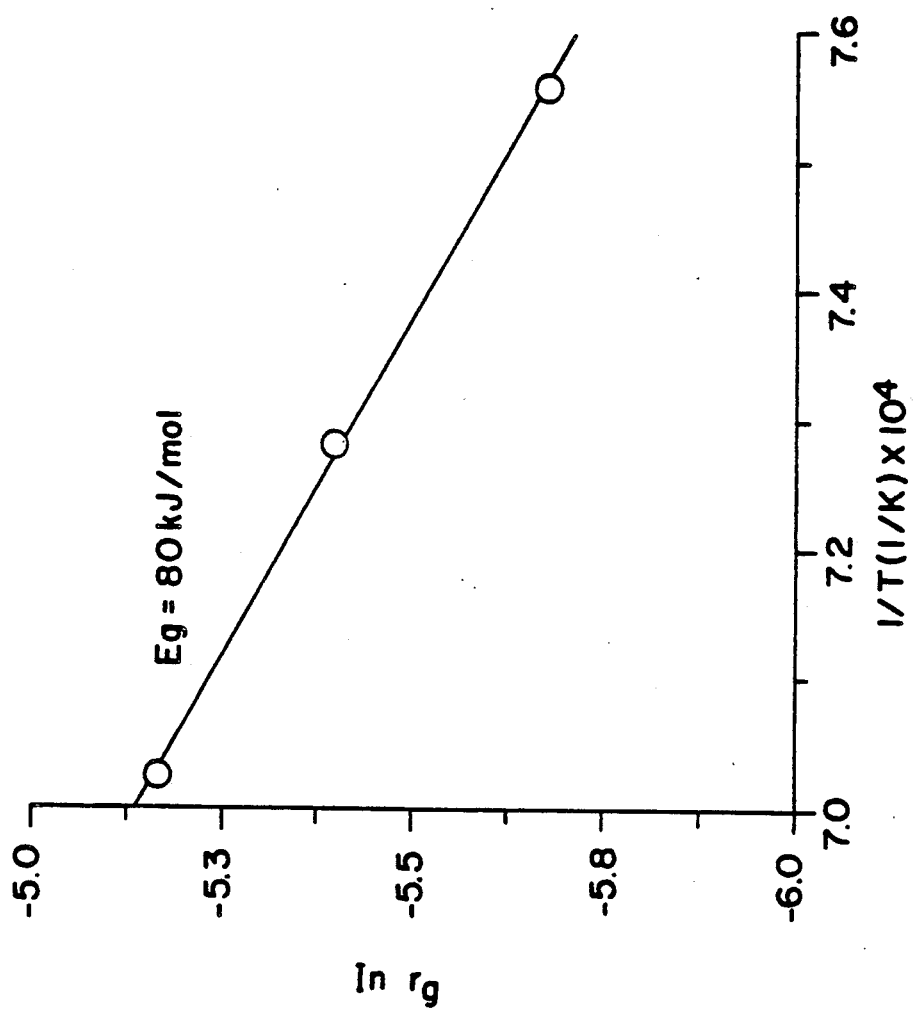
FIG. 10 Determination of apparent activation energy for gasification ($E_g$) for paper precursors containing 0.5 gm stainless steel/sheet.
Figure 11:
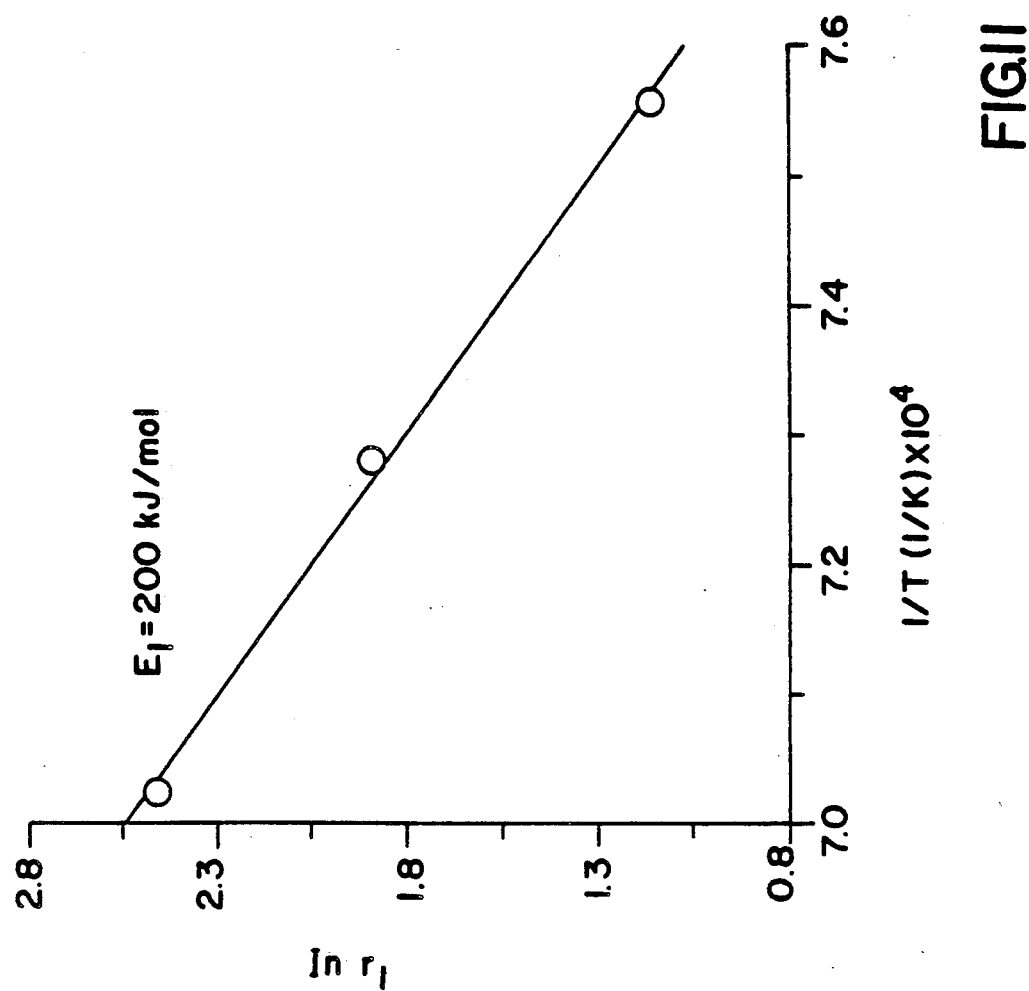
FIG. 11 Determination of apparent activation energy for sintering ($E_1$) for paper precursors containing 0.5 gm stainless steel/sheet.

Reaction rates, at constant stainless steel loading, were also fit to equations [6], [10], and [11] to determine the individual activation energies for the reactions. Arrhenius plots for gasification ($r_g$) and sintering ($r_1$) are shown in FIGS. 10 and 11, respectively. Apparent activation energies for gasification ($E_g$), sintering ($E_1$), and capacitance loss ($E_2$) are listed in Table II.

Rate Constants

With knowledge of the activation energy and order of reaction, the rate constant for each reaction was determined using a least squares analysis. Results are again given in Table II.

DISCUSSION

Capacitance Versus Sintering Time Profiles

The general shape of the profile of capacitance versus sintering time exhibited two distinct regions. The increasing region is attributed to sintering, where the formation of stainless steel-stainless steel contacts or joints provides interconnected pathways to electrically contact the active capacitive material, carbon. The region of capacitance decrease ($t \geq t_1$) may be due to the loss of carbon, or more likely the loss of stainless steel-carbon contacts. If all carbon in the electrode structure contributed equally to the capacitance, as carbon was gasified, the capacitance on a per gram of carbon basis, should be constant. This would yield a horizontal capacitance versus time profile for the region ($t \geq t_1$). Deviations from this behavior indicate that all carbon does not contribute equally to capacitance. The region where carbon is most likely to gasify first is in the neighborhood of stainless steel-carbon contacts where the metal catalyst contacts the carbon. Therefore, as carbon gasifies, the ability to contact carbon through the stainless steel network decreases resulting in an overall drop in electrode capacitance even though significant levels of carbon are still retained.

Effects of Stainless Steel Loading

The orders of reaction in stainless steel for gasification ($n_g$), sintering ($n_1$), and capacitance loss ($n_2$) varied from near zero to almost 0.5. These non-integer orders suggest a complex series of events may be taking place.

For carbon gasification ($r_g$), the observed reaction order ($n_g$), as determined from Equation [6] was 0.072±0.030 (95% confidence level). Within the limits of the experimental data, a plot of reaction rate versus stainless steel loading was linear with a rather shallow slope. Extrapolation of these data to zero stainless steel loading predicted a gasification rate of 0.0030 min$^{-1}$, not zero as assumed by Equation [6]. Because of this, the gasification rate of carbon in the absence of stainless steel, was experimentally determined at 1323 K and found to be ca. 0.0003 min$^{-1}$. This non-zero rate may be due to uncatalyzed gasification, low levels of impurities in the carbon fibers themselves and/or the result of catalytically active impurities in the quartz sintering equipment. However, since the measured background gasification rate was an order of magnitude less than the catalyzed rate, the background rate was considered negligible and the determined rate Equation [6] assumed to be valid.

The near zero order dependence of gasification on stainless steel loading is unexpected and unexplained at present. Calculations according to the procedure of Bird et al., "*Transport Phenomena,*" J. Wiley and Sons (1960), p. 529, did not suggest that the reaction was under diffusion control and changing the rate of $H_2$ flow past the preform from 10 to 50 cc/min (STP) during sintering did not alter the gasification rate.

The rate of sintering ($r_1$), as related to electrode capacitance, increased with stainless steel loading to the power of 0.17±0.01. This order of reaction ($n_1$) suggested a somewhat weak interrelationship between the sintering rate and the amount of stainless steel present. Since the sintering rate was measured indirectly by relating the capacitance to the sintering time, any rigorous evaluation of the reaction order is unwarranted. The fact that the rate increased with stainless steel content was considered satisfactory since the number of stainless steel-stainless steel contacts should increase with increased stainless steel content. However, since many fibers form redundant contacts with other fibers already contacted at other locations, the order determined by capacitance measurements cannot be strictly related to either the order of the surface reaction (i.e., sintering by surface diffusion) or the absolute number of metal contacts.

For the rate of capacitance loss ($r_2$), the measured order of reaction ($n_2$) was determined to be 0.49±0.14. This value differs significantly from that obtained for gasification and again indicates that all carbon does not impact equally on the capacitance. As additional stainless steel was added, the gasification rate changed rather slowly while the capacitance decreased much faster. The observed order of reaction can be rationalized by considering the electrical contacting of carbon to stainless steel. Since stainless steel-carbon contacts are broken after prolonged sintering due to the catalytic gasification of carbon by the metal, increased numbers of metal contacts can provide enhanced contacting at short sintering times but also lead to the loss of capacitance, and the scission of contiguous carbon fibers (as can be readily seen in a scanning electron micrograph), at longer sintering times. The net result of such behavior is a loss in capacitance which is much more pronounced on stainless steel loading than overall carbon removal, and a maximum in capacitance per gram of electrode at intermediate loadings, as discussed subsequently.

Temperature Effects

The apparent activation energies for gasification ($E_g$), sintering ($E_1$), and capacitance loss ($E_2$) were determined from Arrhenius plots of appropriate reaction rates. Values were compared with those obtained for iron, the dominant surface species in 316L stainless steel (5).

For gasification, the apparent activation energy ($E_g$) was found to be 80±5 kJ/mol. This value compared favorably with the literature value of 98.6 kJ/mol as reported for the catalyzed gasification of graphite by iron in hydrogen in the temperature range from 900 to 1100 K (16). The discrepancy between these two values may be the result of temperature differnces, measurement errors in the earlier work (16), and/or inherent differences between the amorphous carbon used in this study and graphite (16).

The activation energy of sintering ($E_1$) was determined to be $204 \pm 19$ kJ/mol. In the literature, an initial activation energy of 270 kJ/mol for gamma-iron powders sintered from 1336 to 1666 K has been reported (17). This value appears to be in reasonable agreement, especially considering the indirect method used in this study to assess sintering behavior.

For capacitance loss, the observed activation energy ($E_2$) was $80 \pm 9$ kJ/mol, nearly identical to that determined for carbon gasification. This again suggests the correspondence between gasification and capacitance loss, when carbon located at or near carbon-stainless steel contacts is removed.

Optimization of Capacitance

Since one possible use of stainless steel-carbon composite electrodes is in liquid double layer capacitors, a procedure was developed to determine the sintering time, temperature and stainless steel loading which maximized the capacitance on a total weight basis (viz., carbon plus stainless steel in the carbon containing layer).

The maximum capacitance on any particular capacitance versus time curve occurred at the intersection of the sintering ($r_1$) line with the capacitance loss ($r_2$) line. The location of this intersection was calculated by combining Equations [12] and [13] and rearranging so that $$t_1 = \frac{b_2}{r_1 + r_2}, \quad [14]$$

where $t_1$ is the optimal sintering time (min). The maximum capacitance $C_{opt}$ (in faradays per gram carbon) was found by substituting Equation [14] for t into Equation [12] which gave:

$$C_{opt} = r_1 t_1 = \frac{r_1 b_2}{r_1 + r_2}. \quad [15]$$

$C_{opt}$ was then corrected to $C_{opt,corr}$ to reflect the added weight of stainless steel in the electrode by:

$$C_{opt} = C_{opt,corr} \frac{M_c}{(M_c + SS)}. \quad [16]$$

The amount of carbon, $M_c$, at time $t_1$ was given by Equation [7]. Substituting for $M_c$ in Equation [16] yields:

$$C_{opt,corr} = \frac{r_1 b_2}{r_1 + r_2} \times \frac{M_{co}(1 - r_g t_1)}{M_{co}(1 - r_g t_1) + SS} \quad [17]$$

The rates $r_g$, $r_1$, $r_2$ were each temperature and composition dependent as defined by Equations [6], [10], and [11]. A similar expression was developed for $b_2$ such that:

$$b_2 = A\exp(B/T)[SS]^C, \quad [18]$$

where $A = 1.4$ F/gm C gm $SS^{0.22}$, $B = 5400$ K, and $C = 0.22$.

Figure 12:
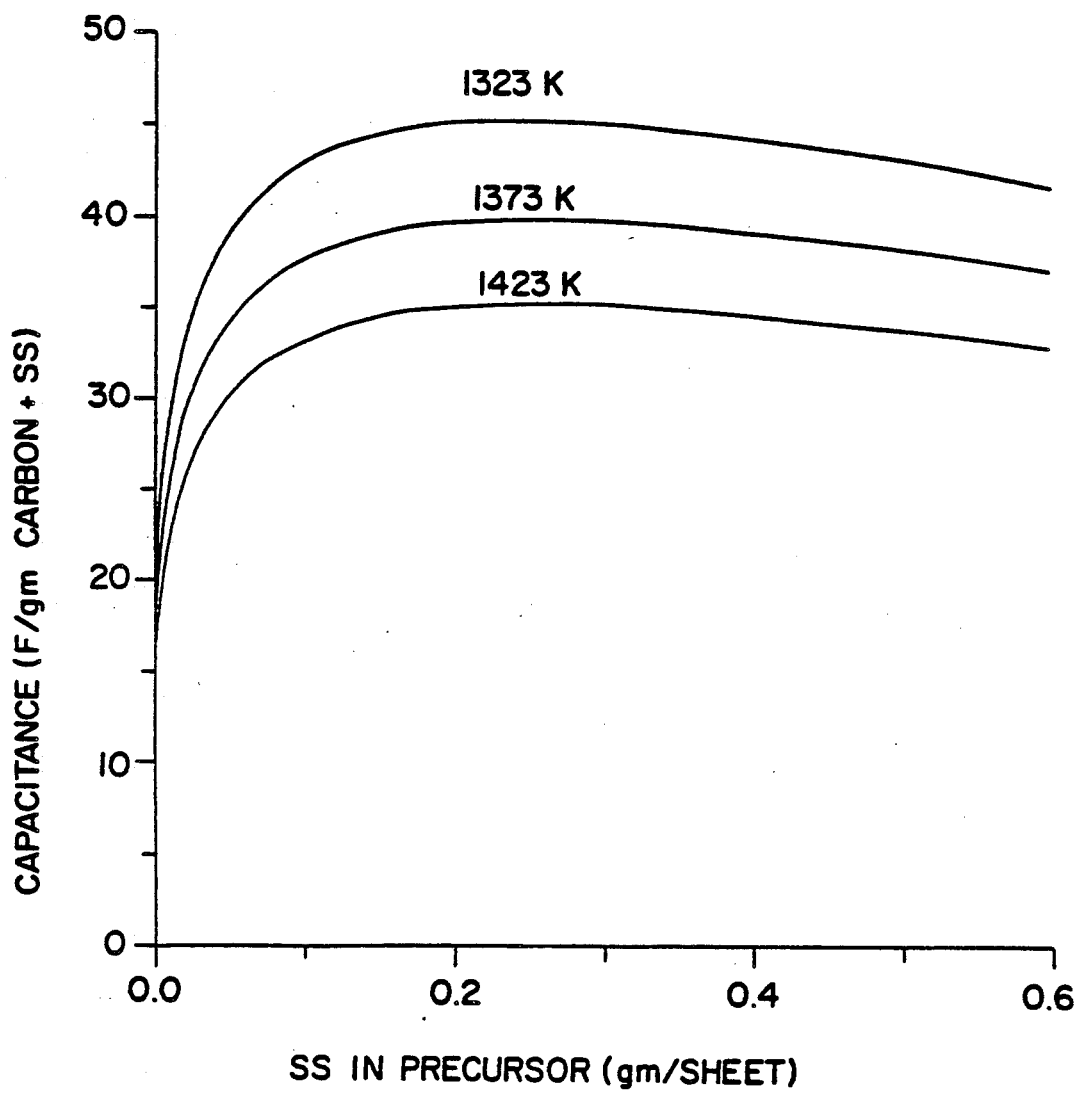
FIG. 12 Determination of maximum capacitance with respect to stainless steel loading and sintering temperature. Corresponding sintering times are a function of the temperature and stainless steel loading and are determined from Equation [14].

Sintering temperature and stainless steel loadings were then varied to determine the maximum capacitance on a total weight basis. The capacitance versus stainless steel loading curves for 1323, 1373, and 1423 K are shown in FIG. 12. The maximum occurred at 1323 K with a stainless steel loading of 0.24 gm stainless steel/gm carbon and the capacitance reaching 45.3 F/gm (carbon plus stainless steel in the carbon containing layer).

Figure 13:
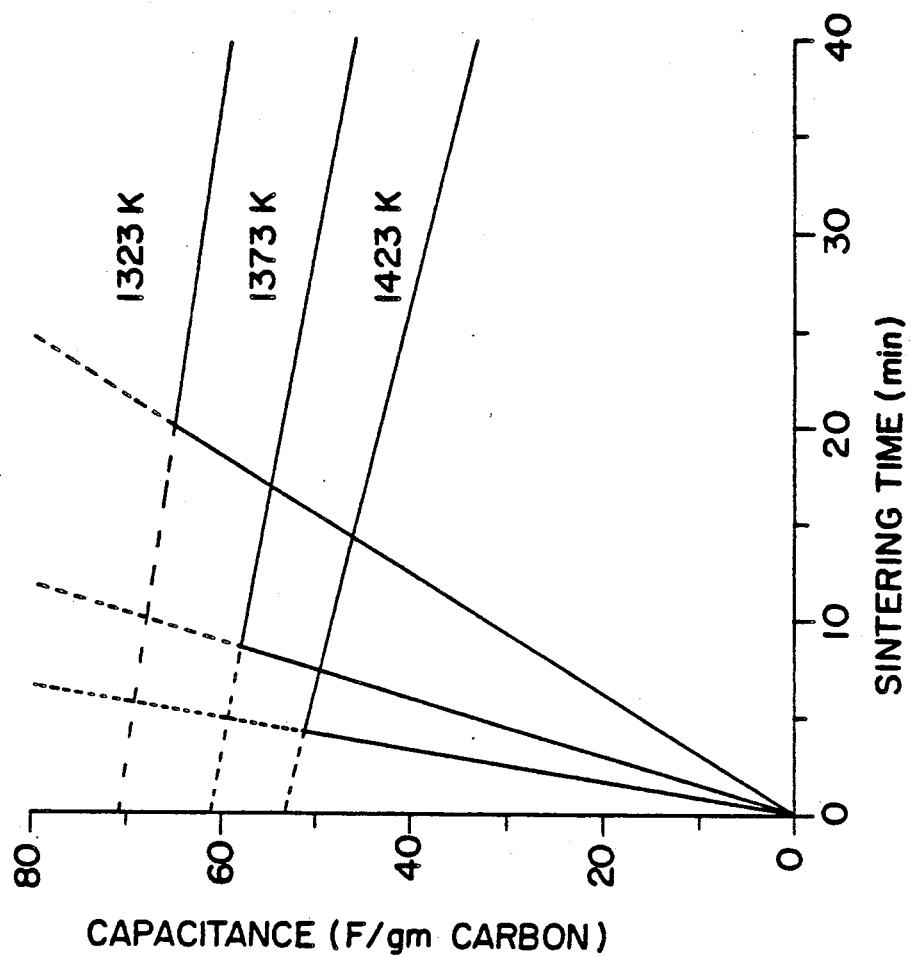
FIG. 13 Least squares fit of capacitance versus time data for electrodes made from a paper precursor containing 0.5 gm stainless steel/sheet, sintered at 1323, 1373, and 1423 K.

Of particular interest was the occurrence of the maximum capacitance at the lowest experimental temperature. This can be most easily explained by considering the experimentally determined reaction rates for sintering and capacitance loss at different temperatures. FIG. 13 shows the least squares fits of capacitance (F/gm C) versus sintering time obtained at a constant stainless steel loading of 0.5 gm/sheet at different temperatures. Experimental data points have been omitted from this figure since these are the same lines/rates determined from the data shown in FIG. 6. As temperature is increased, the rates of sintering and capacitance loss each increased, but the value of $b_2$ (the capacitance intercept) decreased. The decrease of the capacitance intercept appears most responsible for decreases in capacitance at higher temperatures. Efforts to identify the physical significance of $b_2$ are under way (18). Preliminary data suggest that electrodeposition of a metal such as nickel onto the electrode structure to reform lost metal-carbon contacts (with a corresponding increase in capacitance and upward shifting of $b_2$) may be an avenue for better understanding the physical nature of the capacitance intercept.

At constant temperature, as the amount of stainless steel was increased, the capacitance initially grew as the ability to contact carbon improved. A level of addition was reached, however, where the increase in capacitance was no longer large enough to overcome the additional weight of the stainless steel or the increased rate of gasification. Further increases in stainless steel loading decreased the capacitance.

The maximum capacitance of 45.3 F/gm (carbon+stainless steel) was used to estimate the expected electrode energy density. The energy density was calculated using $E = 1/2\ CV^2$ where E is the energy density, C is the maximum capacitance and V=2 volts is the estimated potential range for 1.0M $Na_2SO_4$ at pH 7. Resulting energy densities in the range of 90 kJ/kg of electrode were calculated.

TABLE 1

Parameters describing gasification, sintering, and capacitance loss profiles

| Temp[a] | SS[b] | $r_g$[c] | $r_1$[d] | $r_2$[e] | $b_2$[f] |
|---|---|---|---|---|---|
| 1323 | 0.1 | 0.00307 | 2.42 | 0.127 | 50.7 |
| 1323 | 0.2 | 0.00315 | 2.71 | 0.204 | 56.1 |
| 1323 | 0.5 | 0.00343 | 3.20 | 0.298 | 70.9 |
| 1373 | 0.5 | 0.00453 | 6.62 | 0.378 | 61.2 |
| 1423 | 0.5 | 0.00571 | 11.7 | 0.495 | 53.2 |

[a] Temp = Sintering temperature (K)
[b] SS = Stainless steel loading (gm stainless steel/sheet)
[c] $r_g$ = Rate of gasification $(min)^{-1}$
[d] $r_1$ = Rate of sintering (F (gm carbon)$^{-1}$ min$^{-1}$)
[e] $r_2$ = Rate of capacitance loss (F (gm carbon)$^{-1}$ min$^{-1}$)
[f] $b_2$ = Ordinate intercept of capacitance loss data at t = 0 (F/gm carbon)

TABLE II

| | Parameters describing reaction rates[1] | | |
|---|---|---|---|
| Rate Process | Rate Constant[2] | Apparent Activation Energy (kJ/mol) | Order of Reaction In Stainless Steel |
| Gasification | $k_{go} = 5.1 \pm 0.5$ | $E_g = 80 \pm 5$ | $n_g = 0.072 \pm 0.030$ |
| Sintering | $k_{1o} = 4.0 \pm 0.1 \times 10^8$ | $E_1 = 204 \pm 19$ | $n_1 = 0.17 \pm 0.01$ |
| Capacitance loss | $k_{2o} = 580 \pm 10$ | $E_2 = 80 \pm 9$ | $n_2 = 0.49 \pm 0.14$ |

[1]Associated errors are for a 95% confidence level
[2]Units of rate contants
$k_{go} [=] min^{-1}$ (gm stainless steel)$^{-0.072}$
$k_{1o} [=] F$ (gm carbon)$^{-1}$ min$^{-1}$ (gm stainless steel)$^{-0.17}$
$k_{2o} [=] F$ (gm carbon)$^{-1}$ min$^{-1}$ (gm stainless steel)$^{-0.49}$

What is claimed is:

1. A method of optimizing the capacitance of a stainless steel fiber-carbon fiber composite electrode made by sintering in a hydrogen atmosphere a preform of a network of stainless steel and carbon fibers dispersed in a matrix of an organic binder, where the capacitance is optimized with respect to the independent variables of sintering temperature between a minimum temperature of $T_{min}$ and a maximum temperature of $T_{max}$, sintering time, and the weight ratio of stainless steel fibers to carbon fibers at a constant carbon content between a minimum ratio of ratio$_{min}$ and a maximum ratio of ratio$_{max}$, said method of optimizing comprising determining within the envelope bounded by $T_{min}$, $T_{max}$, ratio$_{min}$ and ratio$_{max}$:

the rate equation, including apparent activation energy, for the increase in capacitance of the composite electrode;
the rate equation, including apparent activation energy, for the decrease in capacitance of the composite electrode;
from the two prior rate equations, the optimal sintering time at which the capacitance is maximized at a given sintering temperature and a given stainless steel to carbon ratio within said envelope;
the capacitance at the optimal sintering time as a function of the sintering temperature and stainless steel to carbon ratio;
choosing the temperature, $T_{opt}$, at which the capacitance is maximized with respect to a stainless steel to carbon ratio within said envelope, and choosing that stainless steel to carbon ratio at $T_{opt}$ where the capacitance is a maximum.

2. The method of claim 1 where the weight ratio of stainless steel fibers to carbon fibers is between about 99 and about 0.02.

3. The method of claim 1 where the carbon fibers have a diameter from about 20 nm to about 1 mm.

4. The method of claim 1 where the carbon fibers have a surface area between 1 and about 1500 square meters per gram.

5. The method of claim 4 where the carbon fibers have a surface area between about 50 and 1350 square meters per gram.

6. The method of claim 5 where the carbon fibers have a surface area between about 250 and about 1000 square meters per gram.

7. The method of claim 1 further characterized in that the composite electrode has a surface area from about 0.001 to about 1350 square meters per gram.

8. The method of claim 1 where the stainless steel fibers have a diameter from about 0.1 to about 10 microns.

9. The method of claim 1 where the weight ratio of stainless steel to carbon is from about 10 to about 0.02.

10. The method of claim 1 where the binder is cellulose.

11. The method of claim 1 where the binder is an organic resin.

12. The method of claim 11 where the resin is selected from the group consisting of polyurethanes, polyvinyl alcohols, epoxy resins, styrene-butadiene latex, urea-formaldehde resins, melamine-formaldehyde resins, and polyamide-polyamine epichlorohydrin resins.

13. The method of claim 1 where the binder is present in an amount from about 2 to about 80 weight percent of the total preform.

14. The method of claim 13 where the binder is cellulose present in an amount between about 10 and about 60 weight percent.

15. A method of optimizing a physical property of a metal fiber-carbon fiber composite which is a network of said fibers having a plurality of bonded junctions at the metal fiber crossing points and made by sintering in a hydrogen atmosphere a preform of a network of metal and carbon fibers dispersed in a matrix of an organic binder, where the physical property is optimized with respect to the independent variables of sintering temperature between a minimum temperature of $T_{min}$ and a maximum temperature of $T_{max}$, sintering time, and the weight ratio of metal fibers to carbon fibers at a constant carbon content between a minimum ratio of ratio$_{min}$ and a maximum ratio of ratio$_{max}$, said method of optimizing comprising determining within the envelope bounded by $T_{min}$, $T_{max}$, ratio$_{min}$ and ratio$_{max}$:

the rate equation, including apparent activation energy, for the increase in the value of said physical property of the composite;
the rate equation, including apparent activation energy, for the decrease in the value of said physical property of the composite;
from the two prior rate equations, the optional sintering time at which the value of said physical property is maximized at a given sintering temperature and a given metal to carbon ratio within said envelope;
the value of said physical property at the optimal sintering time as a function of the sintering temperature and metal to carbon ratio;
choosing the temperature, $T_{opt}$, at which the value of said physical property is maximized with respect to a metal to carbon ratio within said envelope, and choosing that metal to carbon ratio at $T_{opt}$ where the value of said physical property is a maximum.

16. The method of claim 15 where the metal is selected from the group consisting of aluminum, titanium, vanadium, chromium, iron, cobalt, nickel, copper, zinc, zirconium, niobium, molybdenum, ruthenium, rhodium, palladium, silver, cadmium, indium, tin, hafnium, tantalum, tungsten, rhenium, osmium, platinum, gold, antimony, berrylium, iridium, silicon, magnesium, manganese, gallium and their alloys.

17. The method of claim 15 where the weight ratio of metal fibers to carbon fibers is between about 99 and about 0.02.

18. The method of claim 15 where the carbon fibers have a diameter from about 20 nm to about 1 mm.

19. The method of claim 15 where the carbon fibers have a surface area between 1 and about 1500 square meters per gram.

20. The method of claim 19 where the carbon fibers have a surface area between about 50 and 1350 square meters per gram.

21. The method of claim 20 where the carbon fibers have a surface area between about 250 and about 1000 square meters per gram.

22. The method of claim 15 where the metal fibers have a diameter from about 0.1 to about 10 microns.

23. The method of claim 15 where the weight ratio of metal to carbon is from about 10 to about 0.02.

24. The method of claim 15 where the binder is cellulose.

25. The method of claim 15 where the binder is an organic resin.

26. The method of claim 15 where the resin is selected from the group consisting of polyurethanes, polyvinyl alcohols, epoxy resins, styrene-butadiene latex, urea-formaldehde resins, melamine-formaldehyde resins, and polyamide-polyamine epichlorohydrin resins.

27. The method of claim 15 where the binder is present in an amount from about 2 to about 80 weight percent of the total preform.

28. The method of claim 27 where the binder is cellulose present in an amount between about 10 and about 60 weight percent.

* * * * *